United States Patent
Hsu (10) Patent No.: US 9,681,120 B2
(45) Date of Patent: Jun. 13, 2017

(54) METHOD, SYSTEM, AND COMPUTER PROGRAM PRODUCT FOR CONTROLLING STEREO GLASSES

(71) Applicant: Yi-Ou Hsu, Taoyuan (TW)

(72) Inventor: Yi-Ou Hsu, Taoyuan (TW)

( * ) Notice: Subject to any disclaimer, the term of this patent is extended or adjusted under 35 U.S.C. 154(b) by 165 days.

(21) Appl. No.: 14/583,132

(22) Filed: Dec. 25, 2014

(65) Prior Publication Data

US 2016/0191907 A1   Jun. 30, 2016

(51) Int. Cl.
*H04N 13/04* (2006.01)
*G09G 3/00* (2006.01)

(52) U.S. Cl.
CPC ..... *H04N 13/0438* (2013.01); *H04N 13/0497* (2013.01); *H04N 2213/008* (2013.01)

(58) Field of Classification Search
None
See application file for complete search history.

(56) References Cited

U.S. PATENT DOCUMENTS

| 7,724,211 B2 | 5/2010 | Slavenburg et al. |
| 2012/0019637 A1* | 1/2012 | Ko ..... G02B 27/2264 348/56 |
| 2013/0016196 A1* | 1/2013 | Kim ..... H04N 13/0438 348/54 |

* cited by examiner

*Primary Examiner* — Benjamin C Lee
*Assistant Examiner* — David Lee
(74) *Attorney, Agent, or Firm* — Alan D. Kamrath; Kamrath IP Lawfirm, P.A.

(57) ABSTRACT

A method, system, and computer program product are provided for controlling stereo glasses. Left and right eye shutters of stereo glasses are controlled to switch between closed and open orientations and simultaneously remain in a fast switching orientation for a predetermined amount of time between the closed and open orientations. The fast switching orientation of each of the left and right eye shutters has at least one open time and at least one closed time. A duration from a first one of the at least one open time and the at least one closed time through a last one of the at least one open time and at least one closed time is equal to the predetermined mount of time. Each of the at least one open time of the fast switching orientation of each of the left and right eye shutters is shorter than or equal to $\frac{1}{24}$ seconds.

9 Claims, 4 Drawing Sheets

METHOD, SYSTEM, AND COMPUTER PROGRAM PRODUCT FOR CONTROLLING STEREO GLASSES

BACKGROUND OF THE INVENTION

The present invention relates to video displays and, more particularly, to a method, a system, and a computer program product for controlling stereo glasses.

Due to the upsurge of 3D movies and mature development of 3D displays, 3D images, which could only be seen in theatres in the past, can now be watched at homes.

Figure 1:
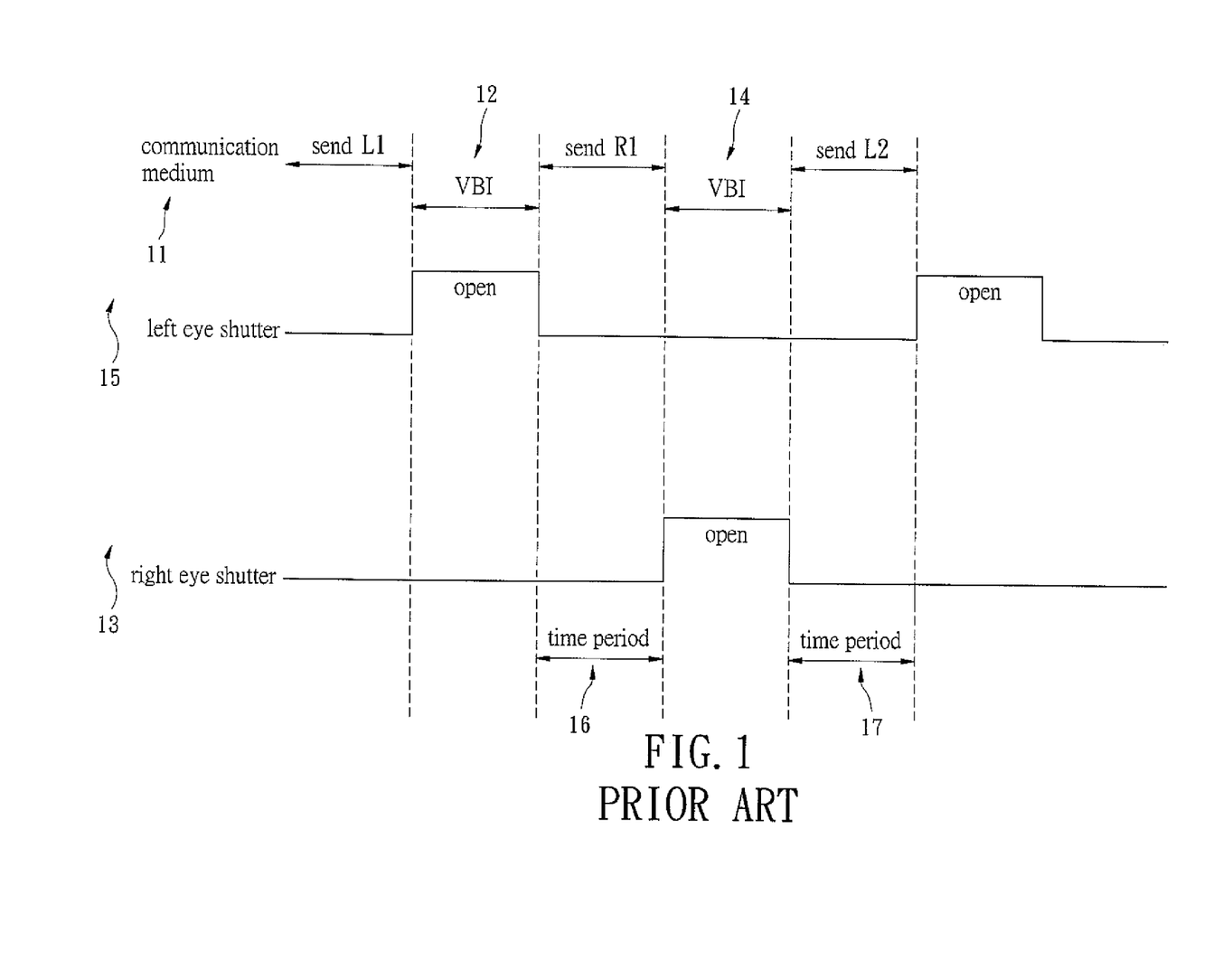
FIG. 1 shows a conventional timing for enhancing a viewing experience when display content is viewed utilizing stereo glasses.

FIG. 1 shows a conventional timing for enhancing a viewing experience when display content is viewed utilizing stereo glasses. A first left image L1 intended for viewing only by a left eye is sent by over a communication medium 11 first. Thereafter, there is a pause, namely, the vertical blanking interval (VBI) 12. Next, a first right image R1 intended for only the right eye is then sent, and so forth. An example of such a conventional timing is shown in U.S. Pat. No. 7,724,211 B2.

The right eye shutter and the left eye shutter of the stereo glasses are controlled independently. A right eye control signal 13 can be utilized to control the right eye shutter, and a left eye control signal 15 can be utilized to control the right eye shutter. The left eye shutter of the stereo glasses may be controlled such that the left eye shutter is in an open orientation at least for the duration of a first set of vertical blanking intervals (VBI) 12. In a similar manner, the right eye shutter of the stereo glasses may be controlled such that the right eye shutter is in the open orientation at least for the duration of a second set of vertical blanking intervals (VBI) 14. The first set of vertical blanking intervals 12 alternate with the second set of vertical blanking intervals 14, and they both occur between periods during which right eye content or left eye content is received from a content source.

The right eye shutter and the left eye shutter of the stereo glasses may be controlled such that the right eye shutter and the left eye shutter simultaneously remain in the closed orientation for a predetermined amount of time 16. As shown, such predetermined amount of time 16 represents a time during which the first left image L1 has been partially overwritten by the first right image R1. Thus, by ensuring that both the right eye shutter and the left eye shutter of the stereo glasses simultaneously remain in the closed orientation during such time, the right eye content is prevented from reaching the left eye and the left eye content is prevented from reaching the right eye.

Thus, the left eye shutter is in the open orientation only for the duration of the first set of vertical blanking intervals 12 (i.e., when only left eye content is being displayed, etc.). Further, the right eye shutter of the stereo glasses is in the open orientation only for the duration of the second set of vertical blanking intervals 14 (i.e., when only right eye content is being displayed, etc.). Thus, such predetermined amount of time 17 represents an entire time frame in which the first left image L1 has been partially overwritten by the first right image R1, and so on.

As disclosed in U.S. Pat. No. 7,724,211 B2, the right eye shutter and the left eye shutter of the stereo glasses are controlled to switch between a closed orientation and an open orientation, and the right eye shutter and the left eye shutter of the stereo glasses can remain in the closed orientation for a predetermined amount of time 16, 17. However, in this controlling method, each of the right eye shutter and the left eye shutter in the closed orientation and during the predetermined amount of time 16, 17 cannot perceive any light, such that a strong contrast of brightness and darkness occurs when the right eye shutter and the left eye shutter switches between the closed orientation and the open orientation, and eyestrain occurs easily. It is, thus, an important issue in this industry to solve the above problem.

BRIEF SUMMARY OF THE INVENTION

An objective of the present invention is to control each of the right eye shutter and the left eye shutter to include a fast switching orientation between a closed orientation and an open position. The fast switching orientation of each of the right eye shutter and the left eye shutter includes at least one open time and at least one closed time, wherein a duration between a first one of the at least one open time and a last one of the at least one closed time is equal to a predetermined amount of time, and each of the at least one open time of the fast switching orientation is shorter than or equal to $1/24$ seconds. Thus, there will be no visual persistence, avoiding the left eye and the right eye from perceiving the content during the overwriting procedures. Furthermore, the visual sensitization of the eyes can be increased while reducing the visual contrast during switching between the open orientation and the closed orientation. Thus, eyestrain is relieved, and the pixel saturation and color saturation are increased.

To achieve the above objective, the present invention provides, in a first aspect, a method for controlling stereo glass. The method includes controlling a right eye shutter of stereo glasses to switch between a closed orientation and an open orientation, with a fast switching orientation located between the closed orientation and the open orientation of the right eye shutter. The method further includes controlling a left eye shutter of the stereo glasses to switch between the closed orientation and the open orientation, with a fast switching orientation located between the closed orientation and the open orientation of the left eye shutter.

The right eye shutter and the left eye shutter of the stereo glasses are controlled such that the right eye shutter and the left eye shutter simultaneously remain in the fast switching orientation for a predetermined amount of time. The predetermined amount of time represents at least one of a time during which a left image has been partially overwritten on a display by a right image intended for the right eye shutter and a time during which the right image has been partially overwritten on the display by a left image intended for the left eye shutter.

The left eye shutter of the stereo glasses is controlled such that the left eye shutter is in the open orientation only for a duration of a first set of vertical blanking intervals, the fast switching orientation of the left eye shutter has at least one open time and at least one closed time, a duration from a first one of the at least one open time and the at least one closed time through a last one of the at least one open time and the at least one closed time of the fast switching orientation of the left eye shutter is equal to the predetermined amount of time, and each of the at least one open time of the fast switching orientation of the left eye shutter is shorter than or equal to $1/24$ seconds.

The right eye shutter of the stereo glasses is controlled such that the right eye shutter is in the open orientation only for a duration of a second set of vertical blanking intervals, the fast switching orientation of the right eye shutter has at least one open time and at least one closed time, a duration from a first one of the at least one open time and the at least one closed time through a last one of the at least one open time and the at least one closed time of the fast switching orientation of the right eye shutter is equal to the predetermined amount of time, and each of the at least one open time of the fast switching orientation of the right eye shutter is shorter than or equal to 1/24 seconds.

In a second aspect, a system for controlling stereo glasses includes a graphics processor and a controller in communication with the graphics processor. The controller is configured for controlling a right eye shutter and a left eye shutter of stereo glasses to switch between a closed orientation and an open orientation, with a fast switching orientation located between the closed orientation and the open orientation.

The system is operable such that the right eye shutter and the left eye shutter of the stereo glasses are controlled such that the right eye shutter and the left eye shutter simultaneously remain in the fast switching orientation for a predetermined amount of time. The predetermined amount of time represents at least one of a time during which a left image has been partially overwritten on a display by a right image intended for the right eye shutter and a time during which the right image has been partially overwritten on the display by a left image intended for the left eye shutter.

The system is operable such that the left eye shutter of the stereo glasses is controlled such that the left eye shutter is in the open orientation only for a duration of a first set of vertical blanking intervals, the fast switching orientation of the left eye shutter has at least one open time and at least one closed time, a duration from a first one of the at least one open time and the at least one closed time through a last one of the at least one open time and the at least one closed time of the fast switching orientation of the left eye shutter is equal to the predetermined amount of time, and each of the at least one open time of the fast switching orientation of the left eye shutter is shorter than or equal to 1/24 seconds.

The system is operable such that the right eye shutter of the stereo glasses is controlled such that the right eye shutter is in the open orientation only for a duration of a second set of vertical blanking intervals, the fast switching orientation of the right eye shutter has at least one open time and at least one closed time, a duration from a first one of the at least one open time and the at least one closed time through a last one of the at least one open time and the at least one closed time of the fast switching orientation of the right eye shutter is equal to the predetermined amount of time, and each of the at least one open time of the fast switching orientation of the right eye shutter is shorter than or equal to 1/24 seconds.

In a third aspect, a computer program product embodied on a computer readable medium includes computer code for controlling a right eye shutter of stereo glasses to switch between a closed orientation and an open orientation, with a fast switching orientation located between the closed orientation and the open orientation of the right eye shutter. The computer program product further includes computer code for controlling a left eye shutter of the stereo glasses to switch between the closed orientation and the open orientation, with a fast switching orientation located between the closed orientation and the open orientation of the left eye shutter.

The computer program product is operable such that the right eye shutter and the left eye shutter of the stereo glasses are controlled such that the right eye shutter and the left eye shutter simultaneously remain in the fast switching orientation for a predetermined amount of time. The predetermined amount of time represents at least one of a time during which a left image has been partially overwritten on a display by a right image intended for the right eye shutter and a time during which the right image has been partially overwritten on a display by a left image intended for the left eye shutter.

The computer program product is operable such that the left eye shutter of the stereo glasses is controlled such that the left eye shutter is in the open orientation only for a duration of a first set of vertical blanking intervals, the fast switching orientation of the left eye shutter has at least one open time and at least one closed time, a duration from a first one of the at least one open time and the at least one closed time through a last one of the at least one open time and the at least one closed time of the fast switching orientation of the left eye shutter is equal to the predetermined amount of time, and each of the at least one open time of the fast switching orientation of the left eye shutter is shorter than or equal to 1/24 seconds.

The computer program product is operable such that the right eye shutter of the stereo glasses is controlled such that the right eye shutter is in the open orientation only for a duration of a second set of vertical blanking intervals, the fast switching orientation of the right eye shutter has at least one open time and at least one closed time, a duration from a first one of the at least one open time and the at least one closed time through a last one of the at least one open time and the at least one closed time of the fast switching orientation of the right eye shutter is equal to the predetermined amount of time, and each of the at least one open time of the fast switching orientation of the right eye shutter is shorter than or equal to 1/24 seconds.

In an example, the at least one open time and the at least one closed time of the fast switching orientation of each of the left and right eye shutters has a plurality of open times and a plurality of closed times respectively. The plurality of open times alternates with the plurality of closed times. Each of the plurality of open times is shorter than or equal to 1/24 seconds.

In an example, the right eye shutter is in the at least one open time when the left eye shutter is in the at least one closed time, and the right eye shutter is in the at least one closed time when the left eye shutter is in the at least one open time.

In an example, each of the left and right eye shutters includes a plurality of open times and a plurality of closed times in the closed orientation. The plurality of open times of the right eye shutter in the closed orientation alternates with the plurality of closed times of the right eye shutter in the closed orientation. Each of the plurality of open times of the right eye shutter in the closed orientation is shorter than or equal to 1/24 seconds. The plurality of open times of the left eye shutter in the closed orientation alternates with the plurality of closed times of the left eye shutter in the closed orientation. Each of the plurality of open times of the left eye shutter in the closed orientation is shorter than or equal to 1/24 seconds.

In an example, the right eye shutter of the stereo glasses is controlled such that the right eye shutter is in the open orientation when only right eye content is being displayed, and the left eye shutter of the stereo glasses is controlled such that the left eye shutter is in the open orientation when only left eye content is being displayed.

The present invention will become clearer in light of the following detailed description of illustrative embodiments of this invention described in connection with the drawings.

DETAILED DESCRIPTION OF THE INVENTION

Figure 2:
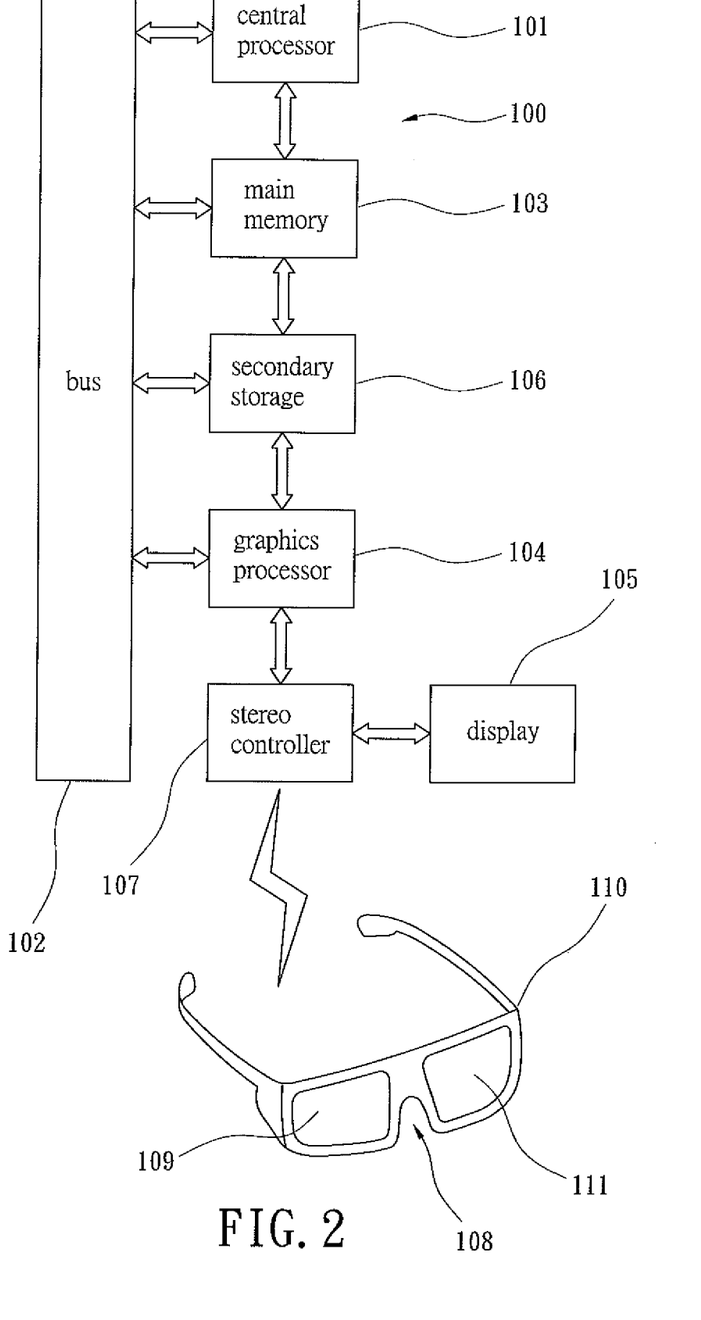
FIG. 2 is a diagram showing a computer system of an embodiment according to the present invention.

With reference to FIG. 2, a computer system 100 of an embodiment according to the present invention includes a central processor 101, a bus 102, a main memory 103, a graphics processor 104, a display 105, a secondary storage 106, a stereo controller 107, and a pair of stereo glasses 108. The central processor 101 is electrically connected to the main memory 103, the graphics processor 104, the display 105, the secondary storage 106, and the stereo controller 107 via the bus 102. The display 105 can be a liquid crystal display (LCD), a digital light processing (DLP) display, a liquid crystal on silicon (LCOS) display, or a plasma display. Computer programs can be stored in the main memory 103 and/or the secondary storage 106. The computer system 100 perform various functions upon execution of the computer programs.

Figure 3:
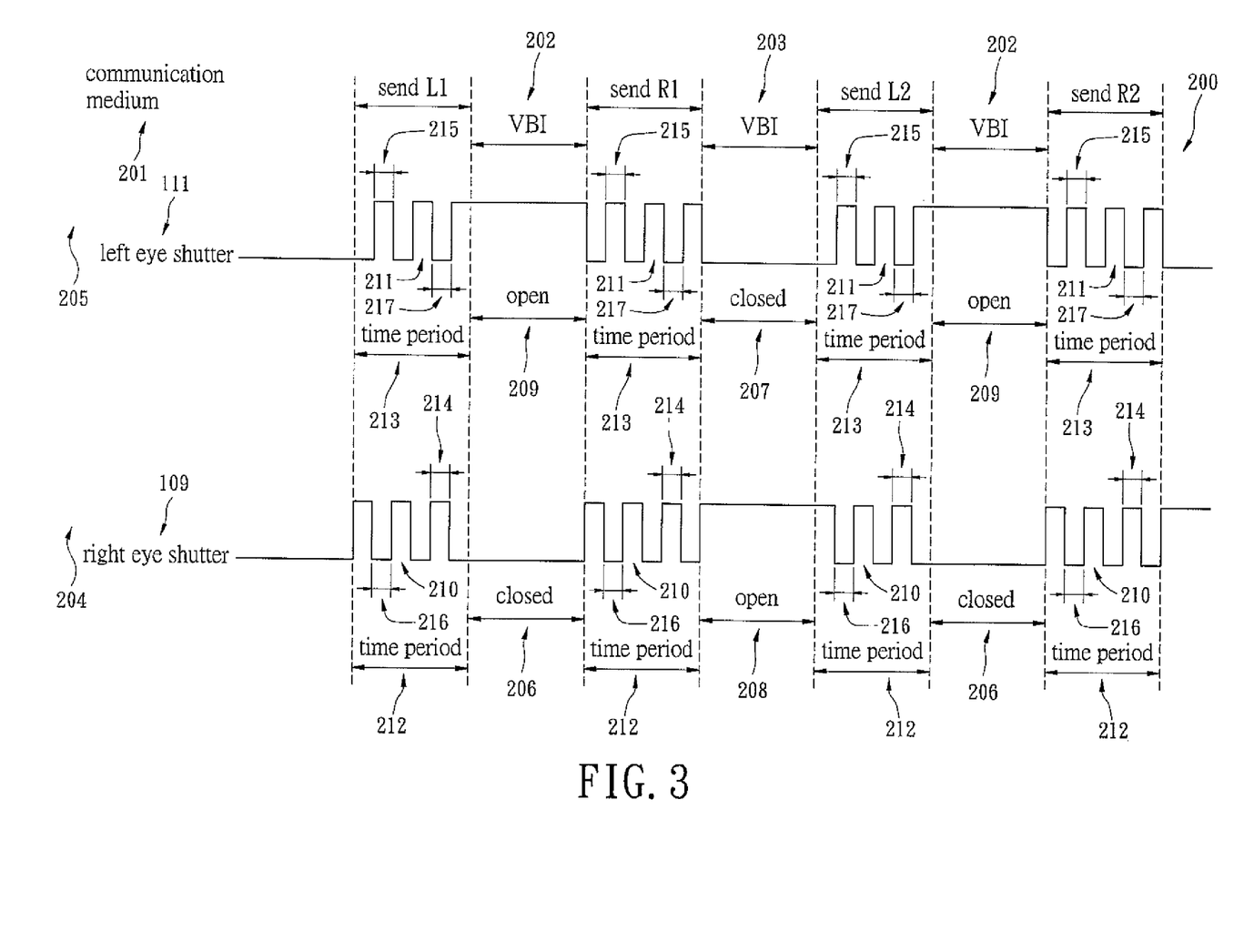
FIG. 3 shows a timing for enhancing a viewing experience when display content is viewed utilizing a method for controlling stereo glasses of an embodiment according to the present invention.

With reference to FIGS. 2 and 3, the stereo glasses 108 includes a right eye shutter 109, a glasses body 110, and a left eye shutter 111. Both the right eye shutter 109 and the left eye shutter 111 are capable of both an open orientation 208, 209 and a closed orientation 206, 207. In use, the open orientation 208, 209 allows more light therethrough with respect to the closed orientation 206, 207. The stereo glasses 108 can be connected to the stereo controller 107 by wire or wireless connection. The stereo controller 107 is connected to the graphics processor 104 and the display 105. The stereo controller 107 can include any hardware and/or software to carry out functionality required for controlling switching of the right eye shutter 109 and the left eye shutter 111.

With reference to FIGS. 2 and 3, the display 105 of the computer system 100 receives display content over a communication medium 201, such as a digital video interface (DVI) or video graphics array (VGA) cable, or a High Definition Multimedia Interface, or a Mobile High-Definition Link (MHL) audio/video interface, or another medium capable of communicating the display content, for that matter. In the timing 200 shown in FIG. 3, a first left image L1 intended for viewing only by a left eye is shown to be sent over the communication medium 201 first. Thereafter, there is a pause in transmission, namely the vertical blanking interval (VBI) 202. Next, a first right image R1 intended for only the right eye is then sent. Thereafter, there is a pause in transmission, namely the vertical blanking interval (VBI) 203. Next, a second left image L2 intended for only the left eye is then sent. Thereafter, there is a pause in transmission, namely the vertical blanking interval (VBI) 202. Next, a second right image R2 intended for only the right eye is then sent, and so forth.

The right eye shutter 109 and the left eye shutter 111 of the stereo glasses 108 are controlled independently. A right control signal 204 can be used to control the right eye shutter 109, and a left control signal 205 can be used to control the left eye shutter 111.

The left eye shutter 111 and the right eye shutter 109 of the stereo glasses 108 can be controlled such that the left eye shutter 111 is in the open orientation 209 at least for the duration of a first set of vertical blanking intervals (VBI) 202, which follow receipt of display content intended for a left eye and such that the right eye shutter 109 is in the open orientation 208 for at least a second set of vertical blanking intervals (VBI) 203, which follow receipt of display content intended for a right eye. The first set of vertical blanking intervals (VBI) 202 alternate with the second set of vertical blanking intervals (VBI) 203. Both of the first set of vertical blanking intervals (VBI) 202 and the second set of vertical blanking intervals (VBI) 203 occur between periods during which right eye content or left eye content is received from a content source.

In the system for controlling stereo glasses, if the stereo glasses 108 uses wireless communication, the right eye shutter 109 and the left eye shutter 111 of the stereo glasses 108 may be controlled utilizing a plurality of signals (e.g., codes of computer programs, etc.). One of the signals can be dispatched to permit synchronous switching of the right eye shutter 109 and the left eye shutter 111 while remaining in a fast switching orientation 210, 211. As shown in FIGS. 2 and 3, the right eye shutter 109 of the stereo glasses 108 has a fast switching orientation 201 between the closed orientation 206 and the open orientation 208. The left eye shutter 111 of the stereo glasses 108 has a fast switching orientation 211 between the closed orientation 207 and the open orientation 209. The right eye shutter 109 and the left eye shutter 111 of the stereo glasses 108 can be controlled such that the right eye shutter 109 and the left eye shutter 111 simultaneously remain in the fast switching orientation 210, 211 for a predetermined amount of time 212, 213. The predetermined amount of time 212, 213 represents at least one of a time during which the first left image L1 has been partially overwritten on the display 105 by the first right image R1 intended for the right eye shutter 109 and a time during which the first right image R1 has been partially overwritten on the display 105 by the second left image L2 intended for the left eye shutter 111, and so on.

By the above arrangement, the left eye shutter 111 of the stereo glasses 108 is controlled such that the left eye shutter 111 is in the open orientation 209 during the first set of vertical blanking intervals (VBI) 202 (i.e., only the left eye content is being displayed). Furthermore, the right eye shutter 109 of the stereo glasses 108 is controlled such that the right eye shutter 109 is in the open orientation 208 during the second set of vertical blanking intervals (VBI) 203 (i.e., only the right eye content is being displayed), and so on.

Specifically, the left eye shutter 111 of the stereo glasses 108 is controlled such that the fast switching orientation 211 of the left eye shutter 111 includes at least one open time 215 and at least one closed time 217 during the predetermined amount of time 213. A duration from a first one of the at least one open time 215 and the at least one closed time 217 through a last one of the at least one open time 215 and the at least one closed time 217 of the fast switching orientation 211 of the left eye shutter 111 is equal to the predetermined amount of time 213. In this embodiment, the fast switching orientation 211 of the left eye shutter 111 has a plurality of open times 215 and a plurality of closed times 217 during the predetermined amount of time 213. The open times 215 alternate with the closed times 217. Each open time 215 is shorter than or equal to $1/24$ seconds. The right eye shutter 109 of the stereo glasses 108 is controlled such that the fast switching orientation 210 of the right eye shutter 109 has at least one open time 214 and at least one closed time 216 during the predetermined amount of time 212. A duration from a first one of the at least one open time 214 and the at least one closed time 216 through a last one of the at least one open time 214 and the at least one closed time 216 of the fast switching orientation 210 of the right eye shutter 109 is equal to the predetermined amount of time 212. In this embodiment, the fast switching orientation 210 of the right eye shutter 109 has a plurality of open times 214 and a plurality of closed times 216 during the predetermined amount of time 212. The open times 214 alternate with the closed times 216. Each open time 214 is shorter than or equal to $1/24$ seconds. Thus, there will be no visual persistence, avoiding the left eye and the right eye from perceiving the content during the overwriting procedures. Furthermore, the visual sensitization of the eyes can be increased while reducing the visual contrast during switching between the open orientation 208, 209 and the closed orientation 206, 207. Thus, eyestrain is relieved, and the pixel saturation and color saturation are increased.

In the method, the system, and the computer program product for controlling stereo glasses, by setting the or each open time 214, 215 during the predetermined amount of time 212, 213 to be shorter than or equal to $1/24$ seconds, such that there will be no visual persistence during each open time 214, 215 of the left eye and the right eye. Furthermore, right eye shutter 109 and the left eye shutter 111 of the stereo glasses 108 rapidly open and close in an opposite order during the predetermined amount of time 212, 213. Namely, the right eye shutter 109 is in the open time 214 when the left eye shutter 111 is in the closed time 217, and the right eye shutter 109 is in the closed time 216 when the left eye shutter 111 is in the open time 215.

Figure 4:
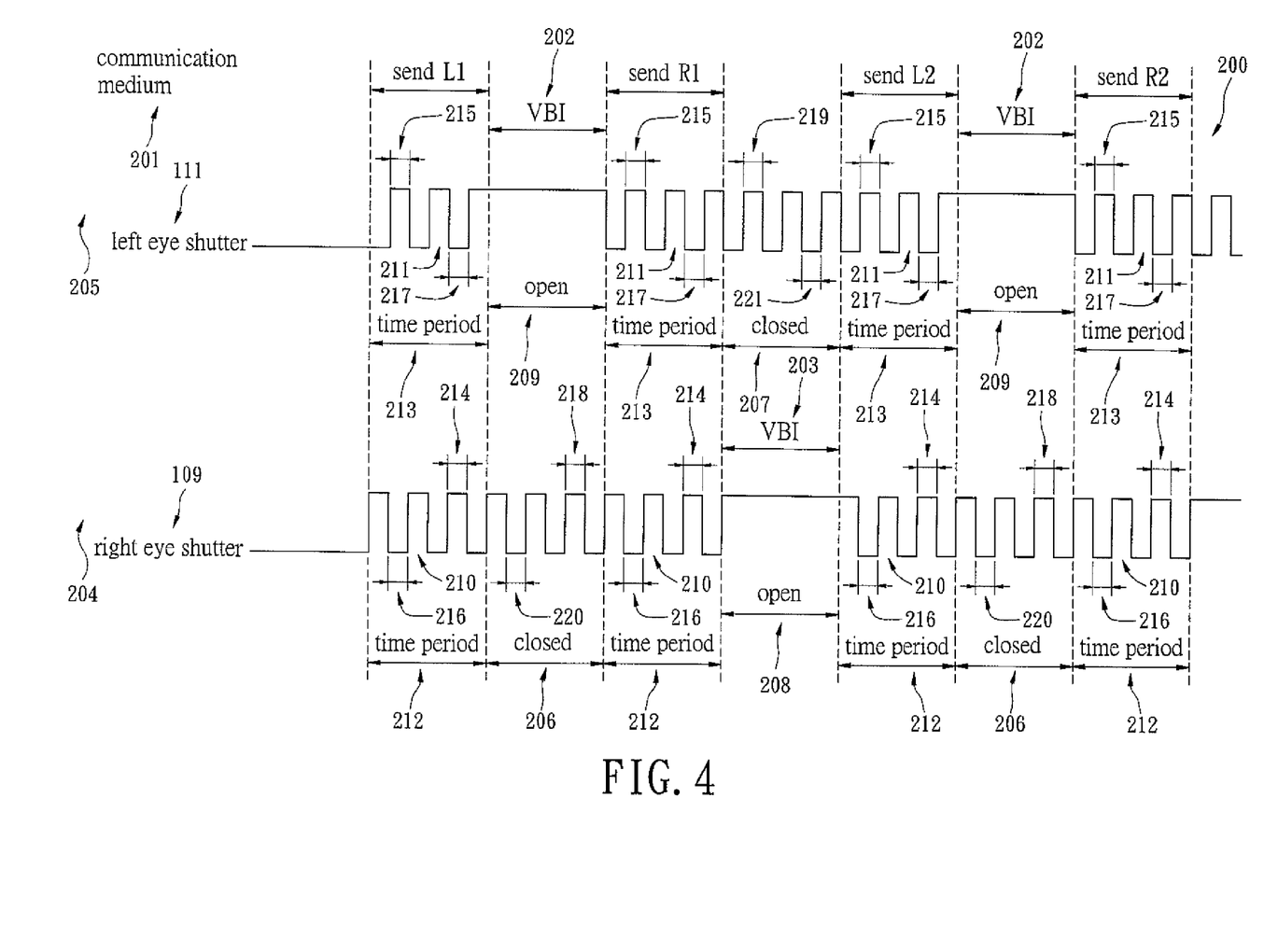
FIG. 4 shows another timing for enhancing a viewing experience when display content is viewed utilizing a method for controlling stereo glasses of another embodiment according to the present invention.

FIG. 4 shows another embodiment of the present invention which is different from the previous embodiment by that the stereo glasses 108 (FIG. 2) is controlled such that each of the left and right eye shutters 109 and 111 includes one or more open times. 218, 219 and one or more closed times 220, 221 in the closed orientation 206, 207. In this embodiment, the open times 218 of the right eye shutter 109 in the closed orientation 206 alternate with the closed times 220 of the right eye shutter 109 in the closed orientation 206. Each open time 218 of the right eye shutter 109 in the closed orientation 206 is shorter than or equal to $1/24$ seconds. The open times 219 of the left eye shutter 111 in the closed orientation 207 alternate with the closed times 221 of the left eye shutter 111 in the closed orientation 207. Each open time 219 of the left eye shutter 111 in the closed orientation 207 is shorter than or equal to $1/24$ seconds. Thus, there will be no visual persistence during each open time 218, 219 of the left eye and the right eye. Furthermore, the visual sensitization of the eyes can be increased while reducing the visual contrast during switching between the open orientation and the closed orientation. Thus, eyestrain is relieved, and the pixel saturation and color saturation are increased.

Although specific embodiments have been illustrated and described, numerous modifications and variations are still possible without departing from the scope of the invention. The scope of the invention is limited by the accompanying claims.

The invention claimed is:

1. A method for controlling stereo glasses, comprising:
controlling a right eye shutter of stereo glasses to switch between a closed orientation and an open orientation, with a fast switching orientation located between the closed orientation and the open orientation of the right eye shutter; and
controlling a left eye shutter of the stereo glasses to switch between the closed orientation and the open orientation, with a fast switching orientation located between the closed orientation and the open orientation of the left eye shutter,
wherein the right eye shutter and the left eye shutter of the stereo glasses are controlled such that the right eye shutter and the left eye shutter simultaneously remain in the fast switching orientation for a predetermined amount of time,
wherein the predetermined amount of time represents at least one of a time during which a left image has been partially overwritten on a display by a right image intended for the right eye shutter and a time during which the right image has been partially overwritten on the display by a left image intended for the left eye shutter,
wherein the left eye shutter of the stereo glasses is controlled such that the left eye shutter is in the open orientation only for a duration of a first set of vertical blanking intervals, the fast switching orientation of the left eye shutter has a plurality of open times and a plurality of closed times alternating with the plurality of open times of the fast switching orientation of the left eye shutter, a duration from a first one of the plurality of open times and the plurality of closed times through a last one of the plurality of open times and the plurality of closed times of the fast switching orientation of the left eye shutter is equal to the predetermined amount of time, and
wherein the right eye shutter of the stereo glasses is controlled such that the right eye shutter is in the open orientation only for a duration of a second set of vertical blanking intervals, the fast switching orientation of the right eye shutter has a plurality of open times and a plurality of closed time times alternating with the plurality of open times of the fast switching orientation of the right eye shutter, a duration from a first one of the plurality of open times and the plurality of closed times through a last one of the plurality of open times and the plurality of closed times of the fast switching orientation of the right eye shutter is equal to the predetermined amount of time, and each of the plurality of open times of the fast switching orientation of each of the left and right eye shutters is shorter than or equal to $1/24$ seconds to avoid visual persistence, thereby avoiding left and right eyes of a wearer wearing the stereo glasses from perceiving a content during overwriting of the left and right images.

2. The method for controlling stereo glasses as claimed in claim 1, wherein the right eye shutter is in one of the plurality of open times when the left eye shutter is in one of the plurality of closed times, and wherein the right eye shutter is in one of the plurality of closed times when the left eye shutter is in one of the plurality of open times.

3. The method for controlling stereo glasses as claimed in claim 1, with each of the left and right eye shutters including a plurality of open times and a plurality of closed times in the closed orientation, with the plurality of open times of the right eye shutter in the closed orientation alternating with the plurality of closed times of the right eye shutter in the closed orientation, with each of the plurality of open times of the right eye shutter in the closed orientation being shorter than or equal to $1/24$ seconds, with the plurality of open times of the left eye shutter in the closed orientation alternating with the plurality of closed times of the left eye shutter in the closed orientation, and with each of the plurality of open times of the left eye shutter in the closed orientation being shorter than or equal to ¹⁄₂₄ seconds.

4. A system for controlling stereo glasses, comprising:
a graphics processor; and
a controller in communication with the graphics processor, with the controller configured for controlling a right eye shutter and a left eye shutter of stereo glasses to switch between a closed orientation and an open orientation, with a fast switching orientation located between the closed orientation and the open orientation,
wherein the system is operable such that the right eye shutter and the left eye shutter of the stereo glasses are controlled such that the right eye shutter and the left eye shutter simultaneously remain in the fast switching orientation for a predetermined amount of time,
wherein the predetermined amount of time represents at least one of a time during which a left image has been partially overwritten on a display by a right image intended for the right eye shutter and a time during which the right image has been partially overwritten on the display by a left image intended for the left eye shutter,
wherein the system is operable such that the left eye shutter of the stereo glasses is controlled such that the left eye shutter is in the open orientation only for a duration of a first set of vertical blanking intervals, the fast switching orientation of the left eye shutter has a plurality of open times and a plurality of closed times alternating with the plurality of open times of the fast switching orientation of the left eye shutter, a duration from a first one of the plurality of open times and the plurality of closed times through a last one of the plurality of open times and the plurality of closed times of the fast switching orientation of the left eye shutter is equal to the predetermined amount of time, and
wherein the system is operable such that the right eye shutter of the stereo glasses is controlled such that the right eye shutter is in the open orientation only for a duration of a second set of vertical blanking intervals, the fast switching orientation of the right eye shutter has a plurality of open times and a plurality of closed times alternating with the plurality of open times of the fast switching orientation of the right eye shutter, a duration from a first one of the plurality of open times and the plurality of closed times through a last one of the plurality of open times and the plurality of closed times of the fast switching orientation of the right eye shutter is equal to the predetermined amount of time, and each of the plurality of open times of the fast switching orientation of each of the left and right eye shutters is shorter than or equal to ¹⁄₂₄ seconds to avoid visual persistence, thereby avoiding left and right eyes of a wearer wearing the stereo glasses from perceiving a content during overwriting of the left and right images.

5. The system for controlling stereo glasses as claimed in claim 4, wherein the right eye shutter is in one of the plurality of open times when the left eye shutter is in one of the plurality of closed times, and wherein the right eye shutter is in one of the plurality of closed times when the left eye shutter is in one of the plurality of open times.

6. The system for controlling stereo glasses as claimed in claim 4, with each of the left and right eye shutters including a plurality of open times and a plurality of closed times in the closed orientation, with the plurality of open times of the right eye shutter in the closed orientation alternating with the plurality of closed times of the right eye shutter in the closed orientation, with each of the plurality of open times of the right eye shutter in the closed orientation being shorter than or equal to ¹⁄₂₄ seconds, with the plurality of open times of the left eye shutter in the closed orientation alternating with the plurality of closed times of the left eye shutter in the closed orientation, and with each of the plurality of open times of the left eye shutter in the closed orientation being shorter than or equal to ¹⁄₂₄ seconds.

7. A computer program product embodied on a computer readable medium, comprising:
computer code for controlling a right eye shutter of stereo glasses to switch between a closed orientation and an open orientation, with a fast switching orientation located between the closed orientation and the open orientation of the right eye shutter; and
computer code for controlling a left eye shutter of the stereo glasses to switch between the closed orientation and the open orientation, with a fast switching orientation located between the closed orientation and the open orientation of the left eye shutter,
wherein the computer program product is operable such that the right eye shutter and the left eye shutter of the stereo glasses are controlled such that the right eye shutter and the left eye shutter simultaneously remain in the fast switching orientation for a predetermined amount of time,
wherein the predetermined amount of time represents at least one of a time during which a left image has been partially overwritten on a display by a right image intended for the right eye shutter and a time during which the right image has been partially overwritten on a display by a left image intended for the left eye shutter,
wherein the computer program product is operable such that the left eye shutter of the stereo glasses is controlled such that the left eye shutter is in the open orientation only for a duration of a first set of vertical blanking intervals, the fast switching orientation of the left eye shutter has a plurality of open times and a plurality of closed times alternating with the plurality of open times of the fast switching orientation of the left eye shutter, a duration from a first one of the plurality of open times and the plurality of closed times through a last one of the plurality of open times and the plurality of closed times of the fast switching orientation of the left eye shutter is equal to the predetermined amount of time, and
wherein the computer program product is operable such that the right eye shutter of the stereo glasses is controlled such that the right eye shutter is in the open orientation only for a duration of a second set of vertical blanking intervals, the fast switching orientation of the right eye shutter has a plurality of open times and a plurality of closed times alternating with the plurality of open times of the fast switching orientation of the right eye shutter, a duration from a first one of the plurality of open times and the plurality of closed times through a last one of the plurality of open times and the plurality of closed times of the fast switching orientation of the right eye shutter is equal to the predetermined amount of time, and each of the plurality of open times of the fast switching orientation of each of the left and right eye shutters is shorter than or equal to ¹⁄₂₄ seconds to avoid visual persistence, thereby avoiding left and right eyes of a wearer wearing the stereo glasses from perceiving a content during overwriting of the left and right images.

8. The computer program product embodied on a computer readable medium as claimed in claim 7, wherein the right eye shutter is in one of the plurality of open times when the left eye shutter is in one of the plurality of closed times, and wherein the right eye shutter is in one of the plurality of closed times when the left eye shutter is in one of the plurality of open times.

9. The computer program product embodied on a computer readable medium as claimed in claim 7, with each of the left and right eye shutters including a plurality of open times and a plurality of closed times in the closed orientation, with the plurality of open times of the right eye shutter in the closed orientation alternating with the plurality of closed times of the right eye shutter in the closed orientation, with each of the plurality of open times of the right eye shutter in the closed orientation being shorter than or equal to $1/24$ seconds, with the plurality of open times of the left eye shutter in the closed orientation alternating with the plurality of closed times of the left eye shutter in the closed orientation, and with each of the plurality of open times of the left eye shutter in the closed orientation being shorter than or equal to $1/24$ seconds.

* * * * *